United States Patent

[11] 3,575,548

[72] Inventor Hiromichi Kurokawa Kanagawa-ken, Japan
[21] Appl. No. 813,937
[22] Filed Apr. 7, 1969
[45] Patented Apr. 20, 1971
[73] Assignee Sony Corporation Tokyo, Japan

[54] COLOR VIDEO SIGNAL GENERATING APPARATUS
7 Claims, 6 Drawing Figs.

[52] U.S. Cl. .......... 178/5.4st
[51] Int. Cl. .......... H04n 9/06
[50] Field of Search .......... 178/5.4 (STC), 5.4, 5.40

[56] References Cited

UNITED STATES PATENTS

| | | | |
|---|---|---|---|
| 2,827,512 | 3/1958 | Stahl et al. | 178/5.4(STC) |
| 2,922,837 | 1/1960 | Boothroyd et al. | 178/5.4(STC) |
| 3,002,051 | 9/1970 | Tait | 178/5.4(STC) |
| 3,510,575 | 5/1970 | Dillenburger | 178/5.4(STC) |

*Primary Examiner*—Robert L. Griffin
*Assistant Examiner*—Richard P. Lange
*Attorneys*—Albert C. Johnston, Robert E. Isner, Lewis H. Eslinger and Alvin Sinderbrand

ABSTRACT: In a color video signal generating apparatus in which an image of the object to be televised is projected through a color filter onto the photoelectric conversion layer of an image pickup tube and is divided into color component stripes which are successively scanned so that the respective light intensities of the stripes appear as corresponding successive color component signals in the electrical output of the tube, there are also formed on the photoelectric conversion layer two sets of bright and dark stripes having respective spatial frequencies that are different from each other and also each different from the spatial frequency of the color component stripes on such layer so as to provide respective index signals in the tube output, a beat signal is derived from the tube output with a frequency that is the difference between the frequencies of the respective index signals, and such beat signal, which may be frequency multiplied to correspond to the frequency of the color component signals, is employed as a reference for separating the color component signals from each other in the tube output.

PATENTED APR 20 1971

3,575,548

INVENTOR.
HIROMICHI KUROKAWA

BY

ATTORNEY

INVENTOR.
HIROMICHI KUROKAWA

BY

ATTORNEY

INVENTOR.
HIROMICHI KUROKAWA

BY

ATTORNEY

COLOR VIDEO SIGNAL GENERATING APPARATUS

This invention relates generally to a color video signal generating apparatus, and more particularly is directed to improvements in such apparatus of the type in which the output of an image pickup tube includes successive color component signals and also index signals to be used as a reference for separating the various color component signals from such output.

In a previously proposed apparatus of the described type, there is projected onto the photoelectric conversion layer of an image pickup tube for scanning by the electron beam of the latter an image of a color filter which consists of stripelike red color filter elements primarily permitting the passage of red color light therethrough, stripelike green color filter elements primarily permitting the passage of green color light therethrough and stripelike blue color filter elements primarily permitting the passage of blue color light therethrough, these three kinds of filter elements being sequentially arranged in a repeating cyclic order. Further, a real image of the object is superimposed on the image of the color filter so as to provide a striped separated color image of the object. In order to separate respective color component signals from the output of the tube obtained by electron beam scanning of the photoconductive layer in the direction across the stripes of the striped color-separated image of the object, a pattern of bright and dark stripes having a repeating cycle width twice as large as the repeating cycle width of the images of the respective color filter elements is formed on the conversion layer in a manner to produce in the tube output an index signal of a frequency one-half the repeating frequency of the color subcarriers, that is, of the respective color component signals. Such index signal is extracted from the tube output and multiplied twice in frequency, to provide reference signals for synchronized phase separation for sampling of the respective color component signals. The foregoing arrangement is defective in that the index signal is mixed into the luminance signal band and is displayed as bright and dark stripes in the reproduced picture to lower the quality of the picture. Further, if the luminance signal is applied to a filter for blocking the index signal frequency and thus avoiding the display of the bright and dark stripes, the luminance signal is considerably weakened or lost.

Accordingly, it is an object of this invention to provide a color video signal generating apparatus of the described type in which the tube output contains index signals of frequencies well outside the luminance band and which can be simply employed to provide a reference signal for color signal separation.

In accordance with an aspect of this invention, the index signals in the tube output are provided with two different frequencies which are both substantially different from the frequencies of the chrominance and luminance signals, respectively, so that the index signals cannot adversely influence the luminance signal, and the reference signal for separation of the color component signals is derived from a beat signal obtained from the difference of the two index signals extracted from the tube output.

It is further a feature of this invention to provide the above-mentioned index signals in the tube output by forming on the photoelectric conversion layer of the tube, as by projection, two sets of bright and dark stripes having respective spatial frequencies that are different from each other and each different from the spatial frequency of the color component stripes imaged on such layer.

The above, and other objects, features and advantages of this invention, will be apparent in the following detailed description of illustrative embodiments thereof which is to be read in connection with the accompanying drawings, wherein.

Figure 1:
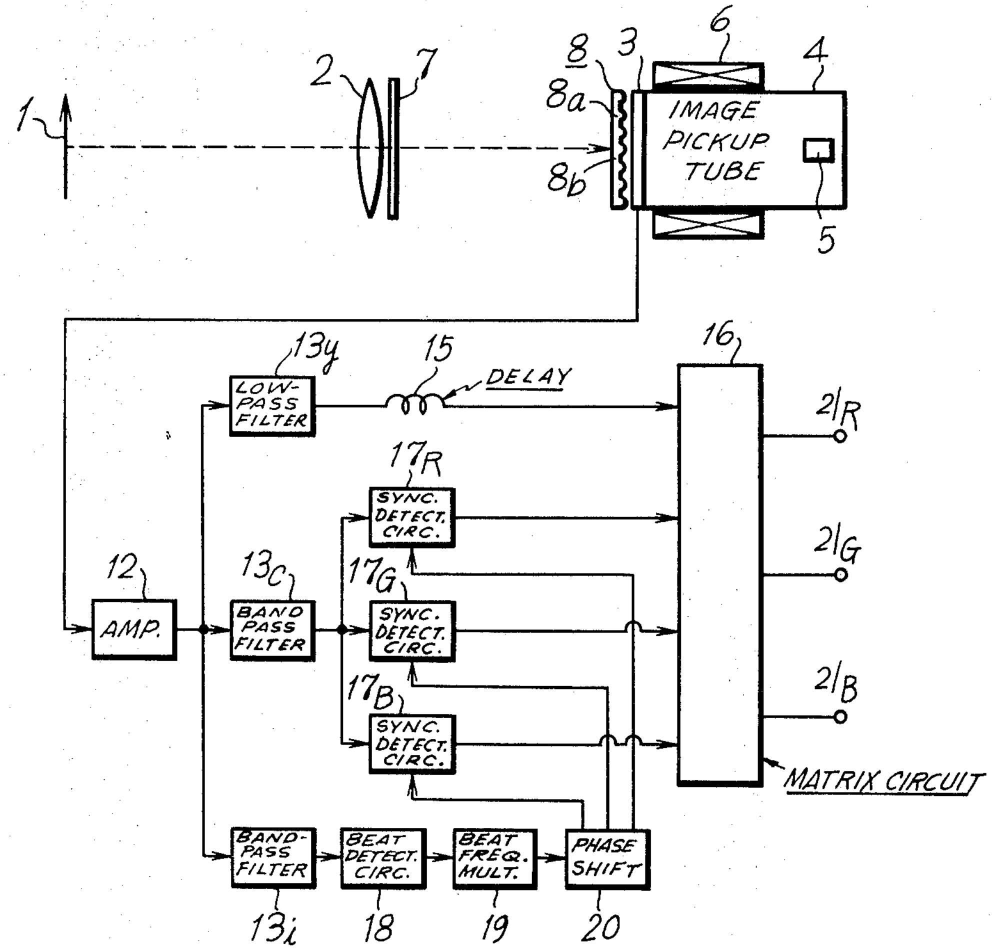
FIG. 1 is a schematic view illustrating the components of a color video signal generating apparatus according to an embodiment of this invention.
Figure 2:
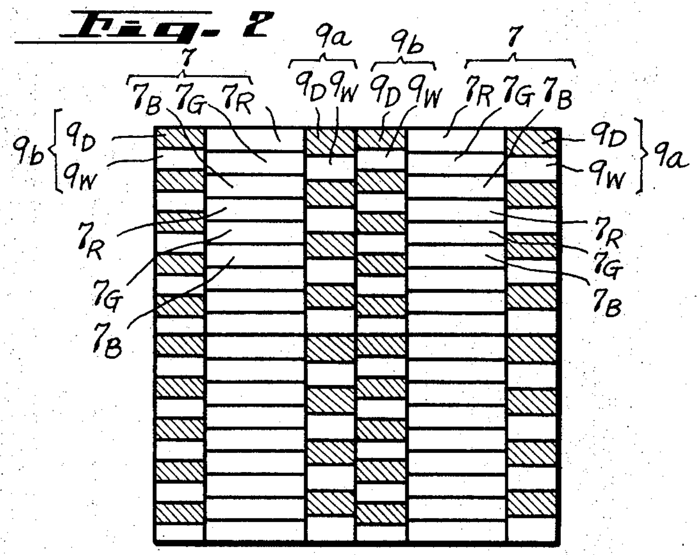
FIG. 2 is an elevational view of a color filter included in the apparatus of FIG. 1.

Referring to the drawings in detail, and initially to FIG. 1 thereof, it will be seen that, in the apparatus there shown an object 1 to be televised is focused by a camera lens 2 into an image on a photoelectric conversion layer 3 of an image pickup tube 4. The photoelectric conversion layer 3 may be a photoconductive layer of a vidicon tube, which further comprises an electron gun 5 adjacent the end of the envelope remote from the photoconductive layer 3 and deflection means 6 by which the electron beam from gun 5 is made to scan layer 3. A striped or banded color filter 7, which consists of a plurality of stripelike color filter elements of different wavelength band pass characteristics, is disposed in the optical path between the object 1 and the photoconductive layer 3. Further, a lens screen 8 consisting of cylindrical lenses 8*a* and flat nonlens portions 8*b* arranged alternately therebetween is disposed in the optical path between the striped color filter 7 and the photoconductive layer 3. As shown in FIG. 2, the color filter 7 comprises stripelike red color filter elements 7R primarily permitting the passage of red color light therethrough, stripelike green color filter elements 7G primarily permitting the passage of green color light therethrough and stripelike blue color filter elements 7B primarily permitting the passage of blue color light therethrough, with these color filter elements being sequentially arranged in a repeating cyclic order.

Further, in the presently described embodiment of the invention, bright and dark filter portions are formed as parts of the color filter 7. More specifically, as shown on FIG. 2, the bright and dark filter portions consist of first and second index image forming portions 9*a* and 9*b*, both of which are composed of alternating stripelike opaque elements 9D and transparent elements 9W. The first and second index image forming portions 9*a* and 9*b* are disposed at opposite sides of the color filter 7 with the opaque and transparent elements being arrayed in the same direction as the stripelike color filter elements. In the embodiment shown, the first index image forming portion 9*a* has its opaque and transparent elements 9D and 9W cyclically repeated four times for three cycles of the three color filter elements 7R, 7G and 7B, and the second index image forming portion 9*b* has its opaque and transparent elements cyclically repeated five times for three cycles of the three color filter elements 7R, 7G and 7B.

Further, in the arrangement shown on FIG. 2, two assemblies of such color filter 7 and index image forming portions 9*a* and 9*b* are formed as a unitary structure in the depicted side-by-side relation.

Figure 3:
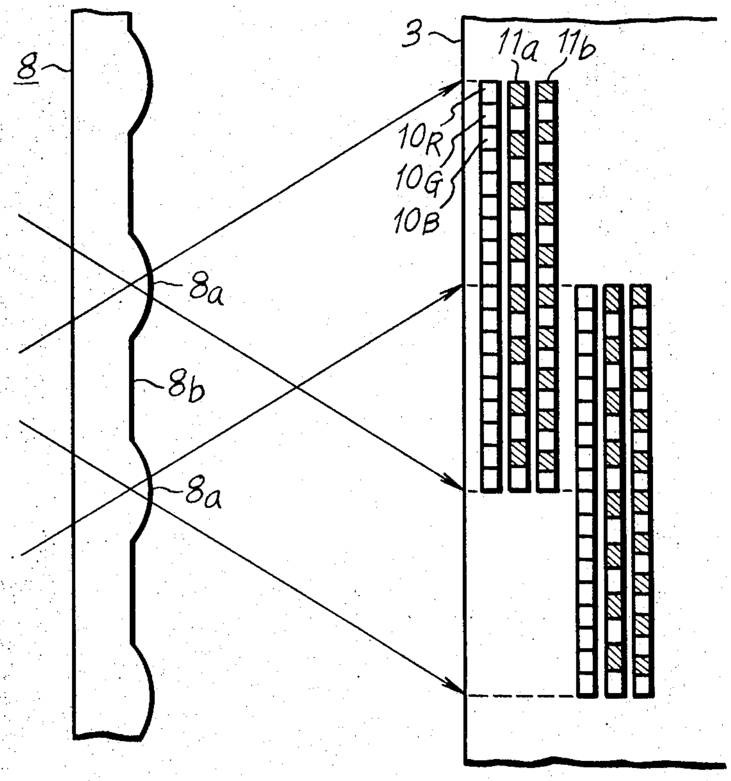
FIG. 3 is an enlarged, detail schematic view illustrating the manner in which the apparatus of FIG. 1 effects color separation.

The lens screen 8 is disposed with its lens elements or cylindrical lenses 8*a* extending in parallel with the stripelike color filter elements of the color filter and is positioned relative to the photoconductive layer 3 in such a manner that the stripelike color filter elements 7R, 7G and 7B of three repeating cycles are focused by each cylindrical lens 8*a* into images on the photoconductive layer at each stripelike area of the latter having a width corresponding to the pitch between adjacent cylindrical lenses 8*a*, as shown on FIG. 3. Consequently, the stripelike color filter elements 7R, 7G and 7B are focused by the lens screen 8 into images 10R, 10G and 10B sequentially in the repeating cyclic order and, at the same time, the first and second index image forming portions 9*a* and 9*b* are similarly focused into images 11*a* and 11*b*. It will be seen that the spatial frequencies of the images 11*a* and 11*b* on layer 3 are different from each other, and also different from the spatial frequency of the images 10R, 10G and 10B. Further, these images 10R, 10G, 10B, 11*a* and 11*b* are seen to be formed in overlapping relation.

Figure 4:
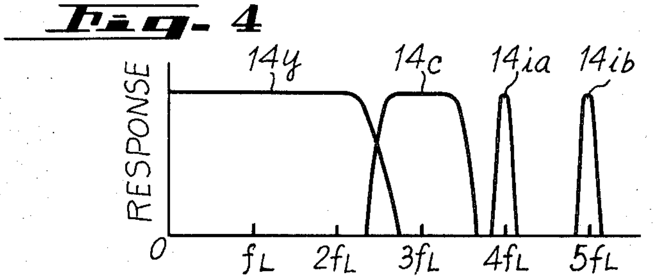
FIG. 4 is a graphic view of the frequency spectra of the various signals included in the electrical output of the image pickup tube in FIG. 1.

The stripelike images of the color filter and index forming portions thus focused on the photoconductive layer 3 are scanned in the direction across the stripelike images by the electron beam from gun 5 to produce an output. Such output is amplified by an amplifier 12, if necessary, and is applied to a low-pass filter 13*y* for the luminance signal, to a band-pass filter 13*c* for the chrominance signal, and to a band-pass filter 13*i* for the index signal, as illustrated in FIG. 1. If a signal frequency produced according to the pitch of the lens elements 8*a* is taken as $f_L$, a chrominance signal 14*c* is produced with its frequency centering on $3f_L$ and a luminance signal 14*y* is similarly produced with its frequency lower than $2.5f_L$ as is apparent from FIG. 4. Further, a first index signal 14*ia* with its frequency centering on $4f_L$ and a second index signal 14*ib* with its frequency centering on $5f_L$ are produced as shown in FIG. 4. Accordingly, the cutoff frequencies of the low-pass filter 13*y*, the pass band of the band-pass filter 13*c* and the pass band of the band-pass filter 13*i* for the index signals are respectively selected to be, for example, $2.5f_L$, $3f_L \pm 0.5f_L$ and $4f_L$ to $5f_L$.

The output of low-pass filter 13*y* is applied to a matrix circuit 16, if necessary, through a delay circuit 15, while the output of band-pass filter 13*c* is fed to synchronous detector circuits 17R, 17G and 17B (FIG. 1). Further, the output of the band-pass filter 13*i* for the index signals is fed to a detector circuit 18 to detect a beat signal between the signal 14*ia* of the frequency $4f_L$ and the signal 14*ib* of the frequency $5f_L$ and the detected beat signal of the frequency $1.0f_L$ is applied to a frequency multiplier circuit 19 to produce a frequency $3f_L$ which is the same as the center frequency of the chrominance signal 14*c*. The multiplied output from circuit 19 is applied to a phase-shifter circuit 20 to produce signals of the frequency $3f_L$ which are displaced 120 degrees apart in phase, as are red, green and blue color component signals, and the resulting signals from circuit 20 are applied as carriers for detection to the synchronous detector circuits 17R, 17G and 17B. As a result of this, the red, green and blue signals are detected by the synchronous detector circuits 17R, 17G and 17B and the detected signals are fed to the matrix circuit 16 having output terminals 21R, 21G and 21B from which the separated wide-band red, green and blue signals are derived.

Figure 5:
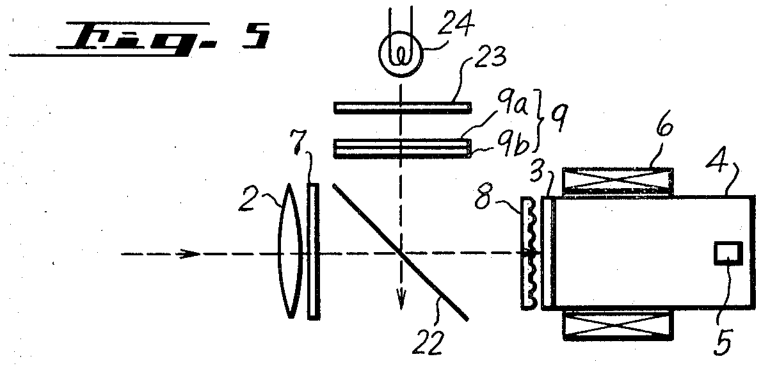
FIGS. 5 and 6 are schematic views each similar to a portion of FIG. 1 and illustrating respective other embodiments of the invention.
Figure 6:
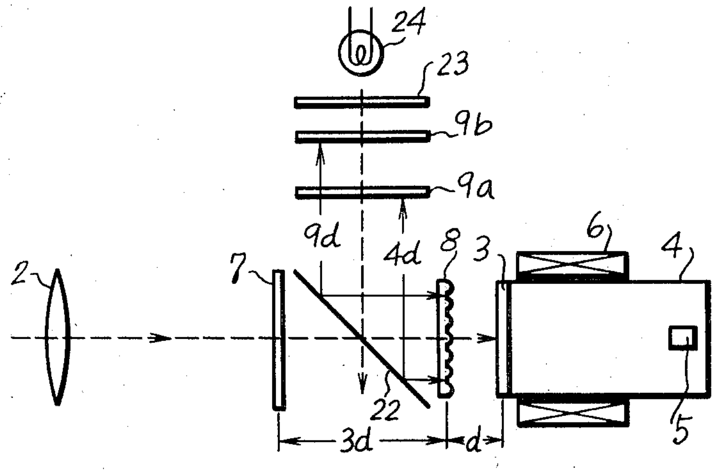

Although the index image forming portions 9*a* and 9*b* are positioned adjacent the color filter 7 and integral with the latter in the foregoing embodiment, it is also possible to project the index images onto the photoconductive layer from a location outside of the optical path between the object 1 and the photoconductive layer 3. For example, in the embodiment shown in FIG. 5, a half-silvered mirror 22 is disposed in the optical path between the color filter 7 and the lens screen 8 and light is directed from a light source 24, if necessary, through a diffusion plate 23, and through an index image forming member 9 which is physically separate from the color filter and which includes the index image forming portions 9*a* and 9*b* depicted in FIG. 2. Light passing through the index image forming member 9 is reflected by half-silvered mirror 22 to project the index image forming portions 9*a* and 9*b* onto the photoconductive layer 3. In this case, the index image forming portions 9*a* and 9*b* may be parts of a single member 9, as on FIG. 5, or such portions 9*a* and 9*b* may be disposed in spaced relation, as illustrated on FIG. 6. If the index image forming portions 9*a* and 9*b* are thus spaced, such portions may be of the same pitch. Where the distances from the lens screen 8 to the photoconductive layer 3, to the color filter 7 and to the index image forming portions 9*a* and 9*b* are respectively selected to be *d*, 3*d*, 4*d* and 9*d*, as indicated on FIG. 6, the pitches of the color filter 7 and the stripes of the index image forming portion 9*a* may be equal to that of the cylindrical lenses 8*a* of lens screen 8, and the pitch of the index image forming portion 9*b* may be twice that of the lens screen 8, whereby 3 cycles of the color filter image, 4 cycles of the bright and dark stripes of the index forming portion 9*a* and 4.5 cycles of the bright and dark stripes of the index image forming portion 9*b* are projected onto the photoconductive layer 3 at each stripelike area corresponding to a pitch the adjacent cylindrical lenses 8*a* of the lens screen 8.

In each of the embodiments of the present invention described above, two sets of bright and dark stripes of different spatial frequencies are formed on the photoconductive layer 3 for generating two respective index signals which are different in frequency band from the chrominance or luminance signal, and the reference signal for the color signal separation is derived from a beat signal representing the difference between the two index signals based upon the bright and dark stripes on the photoconductive layer 3. Accordingly, the luminance signal component is never adversely affected by the index signals, and hence an excellent reproduced picture can be obtained. Further, although the above-described embodiments have employed the lens screen 8 for producing the striped color-separated image of the object to be televised, this lens screen is not always necessary. Thus, for example, the present invention may also be applied to the arrangements where a real image of the object to be televised is focused on the color filter and is projected onto the photoconductive layer directly or through optical means such as a relay lens or the like.

Although illustrative embodiments of the invention have been described in detail herein, it is to be understood that the invention is not limited to those precise embodiments, and that minor changes and modifications may be effected therein by one skilled in the art without departing from the scope or spirit of the invention.

I claim:

1. A color video signal generating apparatus comprising image pickup means having scanning means and being operative to photoelectrically convert light projected on the image pickup means into an electrical output composed of successive signals corresponding to the intensities of light successively encountered by said scanning means in a line scanning direction, filter means interposed optically between an object to be televised and said image pickup means and having several regions respectively selecting light of different wavelength ranges, means cooperating with said filter means for dividing an image of the object to be televised into respective color component stripes projected onto said image pickup means with a predetermined spatial frequency and which appear as successive color component signals in said output, means for forming on the image pickup means two sets of bright and dark stripes having respective spatial frequencies that are different from each other and each different from said spatial frequency of said color component stripes, said sets of bright and dark stripes appearing as respective index signals in said output, means for deriving from said output a beat signal with a frequency that is the difference between the respective frequencies of said index signals, means deriving from said beat signal a reference signal at the frequency of said color component signals, means for phase-shifting said reference signal to provide phase-shifted reference signals corresponding in phase to said color component signals, and means synchronized by said phase-shifted reference signals to separately extract said color component signals from said output.

2. A color video signal generating apparatus according to claim 1, in which said spatial frequencies of the two sets of bright and dark stripes are both substantially greater than said spatial frequency of the color component stripes.

3. A color video signal generating apparatus according to claim 2, in which the difference between said spatial frequencies of said two sets of bright and dark stripes is a fraction of said spatial frequency of the color component stripes, and said means deriving said reference signal includes frequency multiplying means operative to multiply the frequency of said beat signal up to the frequency of said color component signals.

4. A color video signal generating apparatus according to claim 1, in which said means for forming said sets of bright and dark stripes on the image pickup means includes corresponding sets of transparent and opaque regions formed on said filter means so as to be also optically interposed between said object and said image pickup means, with the spatial frequencies of said sets of transparent and opaque regions on the filter means being different from each other and also each different from the spatial frequency of said regions of the filter means which select light of different wavelength ranges.

5. A color video signal generating apparatus according to claim 1, in which said means for forming said sets of bright and dark stripes on the image pickup means includes means defining respective sets of transparent and opaque regions outside of the optical path from said object and said image pickup means, and means projecting images of said sets of transparent and opaque regions onto said image pickup means in overlapping relation to said color component stripes.

6. A color video signal generating apparatus according to claim 5, in which said sets of transparent and opaque regions are arranged in a common plane, and the spatial frequencies of said sets of transparent and opaque regions are different from each other.

7. A color video signal generating apparatus according to claim 5, in which said sets of transparent and opaque regions are arranged in individual planes and each have the same spatial frequency as said regions of the filter means which select light of different wavelength ranges, and in which said planes of the sets of transparent and opaque regions and said filter means are all arranged at different distances from said image pickup means so as to achieve the differences in the spatial frequencies of their images on said image pickup means.